United States Patent
Borkovec et al.

(10) Patent No.: US 11,998,054 B2
(45) Date of Patent: Jun. 4, 2024

(54) ELECTRONIC SMOKING DEVICE

(71) Applicant: Fontem Holdings 1 B.V., Amsterdam (NL)

(72) Inventors: Vaclav Borkovec, Hamburg (DE); Nicole Tschierske, Hamburg (DE)

(73) Assignee: Fontem Ventures B.V., Amsterdam (NL)

( * ) Notice: Subject to any disclaimer, the term of this patent is extended or adjusted under 35 U.S.C. 154(b) by 931 days.

(21) Appl. No.: 17/024,027

(22) Filed: Sep. 17, 2020

(65) Prior Publication Data

US 2021/0068457 A1 Mar. 11, 2021

Related U.S. Application Data

(63) Continuation of application No. 15/579,152, filed as application No. PCT/EP2016/062484 on Jun. 2, 2016, now Pat. No. 10,786,008.

(30) Foreign Application Priority Data

Jun. 2, 2015 (EP) .................................. 15170270

(51) Int. Cl.
*A24F 40/485* (2020.01)
*A24F 40/40* (2020.01)
*A24F 40/60* (2020.01)
*F16K 31/00* (2006.01)
*H05B 3/06* (2006.01)
*A24F 40/10* (2020.01)

(52) U.S. Cl.
CPC ............ *A24F 40/485* (2020.01); *A24F 40/40* (2020.01); *A24F 40/60* (2020.01); *F16K 31/002* (2013.01); *H05B 3/06* (2013.01); *A24F 40/10* (2020.01)

(58) Field of Classification Search
None
See application file for complete search history.

(56) References Cited

U.S. PATENT DOCUMENTS

| | | | |
|---|---|---|---|
| 10,786,008 B2 * | 9/2020 | Borkovec | H05B 3/06 |
| 2014/0144429 A1 | 5/2014 | Wensley et al. | |
| 2014/0190501 A1 | 7/2014 | Liu | |
| 2014/0261488 A1 | 9/2014 | Tucker | |
| 2015/0144147 A1 | 5/2015 | Li et al. | |
| 2016/0309783 A1 | 10/2016 | Hopps | |
| 2016/0331033 A1 | 11/2016 | Hopps | |
| 2016/0367925 A1 * | 12/2016 | Blackley | G08B 25/10 |
| 2017/0047756 A1 | 2/2017 | Xiang | |
| 2017/0208863 A1 | 7/2017 | Davis | |

(Continued)

FOREIGN PATENT DOCUMENTS

| | | |
|---|---|---|
| EP | 2801271 A2 | 11/2014 |
| WO | 2009/135729 A1 | 11/2009 |
| WO | 2013/050934 A1 | 4/2013 |

*Primary Examiner* — James Harvey
(74) *Attorney, Agent, or Firm* — Dykema Gossett PLLC

(57) ABSTRACT

An electronic smoking device is provided comprising a power supply, a liquid reservoir storing a liquid therein and having a liquid reservoir opening, and an atomizer adapted to atomize the liquid stored in the liquid reservoir when operated by the power supply. Further provided are at least two plates provided with an adjustable spacing therebetween, wherein a liquid flow passage is formed between the at least two plates extending from the liquid reservoir opening to the atomizer.

20 Claims, 12 Drawing Sheets

(56) References Cited

U.S. PATENT DOCUMENTS

| | | | |
|---|---|---|---|
| 2018/0154092 A1* | 6/2018 | Patoret | .................... A24F 40/42 |
| 2018/0160735 A1 | 6/2018 | Borkovec | |
| 2018/0168238 A1 | 6/2018 | Kane | |
| 2018/0242637 A1 | 8/2018 | Borkovec | |
| 2018/0343925 A1 | 12/2018 | Wensley | |
| 2018/0360113 A1 | 12/2018 | Reinitz | |
| 2019/0053544 A1 | 2/2019 | Yamada | |
| 2019/0093783 A1 | 3/2019 | Macko | |
| 2019/0335814 A1 | 11/2019 | Qiu | |
| 2021/0068457 A1* | 3/2021 | Borkovec | ................ H05B 3/06 |

* cited by examiner

ELECTRONIC SMOKING DEVICE

CROSS-REFERENCE TO RELATED APPLICATIONS

This application is a continuation of U.S. patent application Ser. No. 15/579,152, filed 1 Dec. 2017 (the '152 application); which is a national stage filing based upon international application no. PCT/EP2016/062484 (the '484 application), filed 2 Jun. 2016 and published in English on 8 Dec. 2016 under international publication no. WO 2016/193365 A1. This application claims priority to European patent application no. 15170270.1 (the '270 application), filed 2 Jun. 2015 and published in English on 7 Dec. 2016 under European publication no. EP3100621. The '152 application; the '484 application; and the '270 application are hereby incorporated by reference as though fully set forth herein.

FIELD OF INVENTION

The present invention relates generally to electronic smoking devices and in particular to electronic cigarettes.

BACKGROUND OF THE INVENTION

An electronic smoking device, such as an electronic cigarette (e-cigarette), typically has a housing accommodating an electric power supply (e.g. a single use or rechargeable battery, electrical plug, or other power supply), and an electrically operable atomizer. The atomizer vaporizes or atomizes liquid supplied from a reservoir and provides vaporized or atomized liquid as an aerosol. Control electronics control the activation of the atomizer. In some electronic cigarettes, an airflow sensor is provided within the electronic smoking device which detects a user puffing on the device (e.g., by sensing an under-pressure or an air flow pattern through the device). The airflow sensor indicates or signals the puff to the control electronics to power up the device and generate vapor. In other e-cigarettes, a switch is used to power up the e-cigarette to generate a puff of vapor.

It is known in the art to provide the atomizer with a wick to use its capillary force to draw liquid from the liquid reservoir.

SUMMARY OF THE INVENTION

In accordance with one aspect of the present invention there is provided an electronic smoking device comprising a liquid reservoir storing a liquid therein and having a liquid reservoir opening and an atomizer adapted to atomize the liquid stored in the liquid reservoir. At least two plates are provided with an adjustable spacing therebetween, wherein a liquid flow passage is formed between the at least two plates extending from the liquid reservoir opening to the atomizer.

The adjustment of the spacing between the at least two plates allows a variation of the size of the liquid flow passage and consequently of the amount of liquid supplied to the atomizer.

The at least two metal places with the liquid flow passage in between form a capillary tube which draws the liquid stored in the reservoir towards the atomizer by capillary force. Thus, the electronic smoking device has a capillary tube provided between the atomizer and the liquid reservoir. The capillary tube comprises the at least two plates provided with an adjustable spacing therebetween, wherein a liquid flow passage is formed between the at least two plates extending from the liquid reservoir opening to the atomizer.

The at least two plates are adapted to operate in a first mode, in which the at least two plates are provided to substantially close the liquid reservoir opening such that no liquid is provided to the atomizer and in a second mode, in which the at least two plates are provided spaced apart from each other such that the liquid is supplied to the atomizer.

In accordance with another aspect of the present invention there is provided an atomizer/liquid reservoir portion for an electronic smoking device comprising a liquid reservoir storing a liquid therein and having a liquid reservoir opening and an atomizer adapted to atomize the liquid stored in the liquid reservoir. At least two plates are provided with an adjustable spacing therebetween, wherein a liquid flow passage is formed between the at least two plates extending from the liquid reservoir opening to the atomizer.

The characteristics, features and advantages of this invention and the manner in which they are obtained as described above, will become more apparent and be more clearly understood in connection with the following description of exemplary embodiments, which are explained with reference to the accompanying drawings.

BRIEF DESCRIPTION OF THE DRAWINGS

In the drawings, same element numbers indicate same elements in each of the views.

DESCRIPTION OF THE PREFERRED EMBODIMENTS

Figure 1:
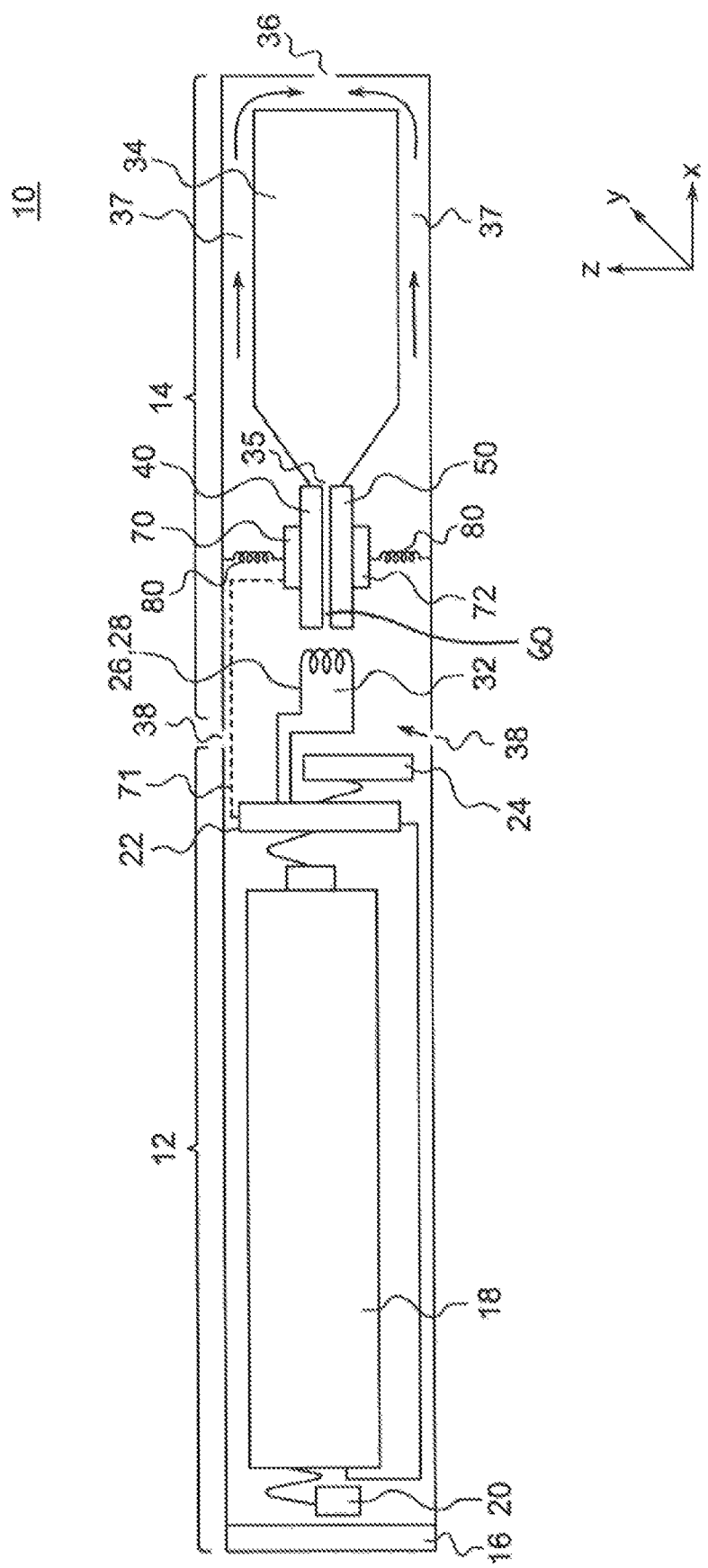
FIG. 1 is a schematic cross-sectional illustration of an exemplary e-cigarette in a first mode of operation.
Figure 2:
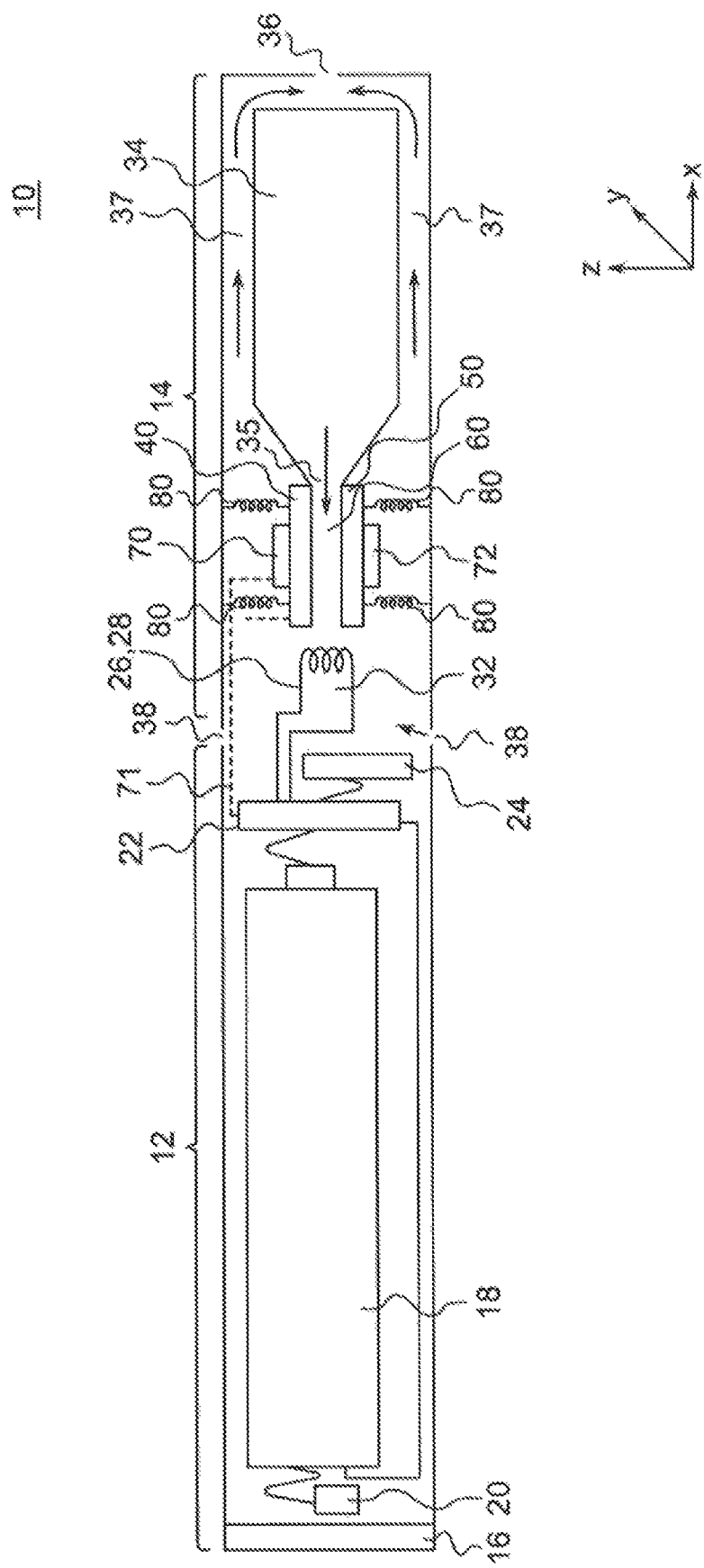
FIG. 2 is a schematic cross-sectional illustration of the exemplary e-cigarette of FIG. 1 in a second mode of operation.

Throughout the following, an electronic smoking device will be exemplarily described with reference to an e-cigarette. FIG. 1 and FIG. 2 show an electronic smoking device in a first embodiment of the invention. The electronic smoking device is shown in a first mode of operation relating to an off-state of the electronic smoking device.

As is shown in FIG. 1, an e-cigarette 10 typically has a housing comprising a cylindrical hollow tube having an end cap 16. The cylindrical hollow tube may be a single piece or a multiple piece tube. In FIG. 1, the cylindrical hollow tube is shown as a two piece structure having a power supply portion 12 and an atomizer/liquid reservoir portion 14. Together the power supply portion 12 and the atomizer/liquid reservoir portion 14 form a cylindrical tube which is approximately the same size and shape as a conventional cigarette, typically about 100 mm with a 7.5 mm diameter, although lengths may range from 70 to 150 or 180 mm, and diameters from 5 to 20 mm.

The power supply portion 12 and atomizer/liquid reservoir portion 14 are typically made of steel or hardwearing plastic and act together with the end cap 16 to provide a housing to contain the components of the e-cigarette 10. The power supply portion 12 and an atomizer/liquid reservoir portion 14 may be configured to fit together by a friction push fit, a snap fit, or a bayonet attachment, magnetic fit, or screw threads. The end cap 16 is provided at the front end of the power supply portion 12. The end cap 16 may be made from translucent plastic or other translucent material to allow an LED 20 positioned near the end cap to emit light through the end cap. The end cap can be made of metal or other materials that do not allow light to pass.

An air inlet may be provided in the end cap, at the edge of the inlet next to the cylindrical hollow tube, anywhere along the length of the cylindrical hollow tube, or at the connection of the power supply portion 12 and the atomizer/liquid reservoir portion 14. FIG. 1 shows a pair of air inlets 38 provided at the intersection between the power supply portion 12 and the atomizer/liquid reservoir portion 14.

A power supply 18 which may be exemplarily a battery, a light emitting diode (LED) 20, control electronics 22 and optionally an airflow sensor 24 are provided within the cylindrical hollow tube power supply portion 12. The power supply 18 is electrically connected to the control electronics 22, which are electrically connected to the LED 20 and the airflow sensor 24. In this example the LED 20 is at the front end of the power supply portion 12, adjacent to the end cap 16 and the control electronics 22 and airflow sensor 24 are provided in the central cavity at the other end of the power supply 18 adjacent the atomizer/liquid reservoir portion 14.

The airflow sensor 24 acts as a puff detector, detecting a user puffing or sucking on the atomizer/liquid reservoir portion 14 of the e-cigarette 10. The airflow sensor 24 can be any suitable sensor for detecting changes in airflow or air pressure such a microphone switch including a deformable membrane which is caused to move by variations in air pressure. Alternatively the sensor may be a Hall element or an electro-mechanical sensor.

The control electronics 22 are also connected to an atomizer 26. In the example shown, the atomizer 26 includes a heating coil 28 extending across a central passage 32 of the atomizer/liquid reservoir portion 14. The coil 28 may be positioned anywhere in the atomizer 26 and may be transverse or parallel to the liquid reservoir 34. The heating coil 28 does not completely block the central passage 32. Rather an air gap is provided on either side of the heating coil 28 enabling air to flow past the heating coil 28. The atomizer may alternatively use other forms of heating elements, such as ceramic heaters, or fiber or mesh material heaters. Non-resistance heating elements such as sonic, piezo and jet spray may also be used in the atomizer in place of the heating coil.

An air inhalation port 36 is provided at the back end of the atomizer/liquid reservoir portion 14 remote from the end cap 16. The inhalation port 36 may be formed from the cylindrical hollow tube atomizer/liquid reservoir portion 14 or maybe formed in an end cap.

A liquid reservoir 34 is provided between the atomizer 26 and the air inhalation port 36. The liquid reservoir 34 is arranged spaced apart from the wall of the housing of the atomizer/liquid reservoir portion 14 such that upper and lower passages 37 are formed around the liquid reservoir 34 toward the inhalation port 36. The end of the liquid reservoir 34 facing the atomizer 26 is provided with an opening 35. Towards the liquid reservoir opening 35, the liquid reservoir 34 may have a tapered end such that the end of the liquid reservoir 34 with the opening 35 has a shape of a nozzle. However, other shapes are also possible. Between the liquid reservoir opening 35 and the atomizer 26, a first plate 40 and a second plate 50 are provided. The first and second plates 40, 50 each extend in a direction from the liquid reservoir opening 35 towards the atomizer 26. The first and second plate 40, 50 are arranged parallel to each other. In a first state as shown in FIG. 1, the first and second plates 40, 50 are only slightly spaced apart such that a liquid stored in the liquid reservoir 34 is drawn into a liquid flow passage 60 between the first and second plates 40, 50 by capillary force. However, the spacing between the plates 40, 50 in FIG. 1 is such that the capillary force is not sufficient to draw the liquid up to the atomizer 28. Consequently, the atomizer 28 is not supplied with a liquid. This corresponds to an off-state of the electronic smoking device 10. The spacing sufficient to allow liquid to enter the liquid flow passage 60 but not to reach the atomizer 28 may be called a minimum spacing or an off-state spacing between the first and second plates 40, 50. The off-state spacing has the advantage that liquid is quickly supplied to the atomizer 28 when needed since liquid is already present in the liquid supply passage 60. The first and second plates 40, 50 in this first state could also be formed to be in contact with each other such that the liquid reservoir opening 35 is blocked by end faces of the first and second plates 40, 50. Such configuration has the advantage that no leakage, for instance due to an impact on the electronic smoking device 10, may occur.

In a second state of the plate configuration as shown in FIG. 2, the first and second plates 40, 50 are (further) spaced apart from each other such that liquid stored in the liquid reservoir 34 is supplied to the atomizer 26 from the liquid reservoir opening 35 through the liquid flow passage 60 between the first and second plates 40, 50. Thus, this second state of the plates 40, 50 relates to a second mode of operation of the electronic smoking device 10, the on-state. The first and second plates 40, 50 extend in the xy-plane of FIG. 1 and are formed on top of each other in the z-direction. The atomizer 26 is spaced from the liquid reservoir 34 in the x-direction. End faces of the first and second plates 40, 50 extending in a yz-direction are in communication with the liquid reservoir opening 35 in FIG. 1. In the second state as shown in FIG. 2, the first and second plates 40, 50 are spaced apart from each other in the z-direction.

In the first embodiment of FIGS. 1 and 2, in order to vary the spacing of the first and second plate 40, 50, the first plate 40 is provided with an electromagnet 70 connected to the power supply 18 via an electrical connection 71. The second plate 50 is provided with a magnetic element 72 such as a coil. Both plates 40, 50 are provided with resilient elements 80 attached to each plate 40, 50 biasing the first and second plates 40, 50 towards each other. The resilient elements 80 shown in FIG. 1 and FIG. 2 are exemplarily springs. However, they can be any flexible element biasing the first and second plates 40, 50 toward each other. FIG. 1 shows exemplarily two springs 80, one attached to the first plate 40 or the electromagnet 70 being attached to the first plate 40, the other attached to the second plate 50 or the magnetic element 72. FIG. 2 shows a modification with four springs 80, each plate 40, 50 being provided with two springs 80. When the electromagnet 70 is operated by the power supply 18, the electromagnet 70 and the magnetic element 72 repel each other such that the first and second plates 40, 50 are forced apart from each other against the force of the resilient elements 80 to open or further open the liquid reservoir opening 35. Thereby, liquid is drawn into the liquid flow passage 60 (in the case the off-state relates to closed plates) or further drawn into the liquid flow passage 60 (in the case the plates are slightly spaced apart in the off-state) between the first and second plate 40, 50 extending from the liquid reservoir opening 35 towards the heating coil 28 such that liquid reaches the atomizer 26. In FIGS. 1 and 2, a separate magnetic element 72 is shown. However, the second plate 50 could also be formed to be magnetic and to be repelled by the electromagnet 70 such that a separate magnetic element 72 is not required but is provided by the second plate 50 itself.

In use, a user sucks on the e-cigarette 10. This causes air to be drawn into the e-cigarette 10 via one or more air inlets, such as air inlets 38 and to be drawn through the central passage 32 along upper and lower passages 37 around the liquid reservoir 34 towards the air inhalation port 36. The air flow is indicated by arrows in FIG. 1. The change in air pressure which arises is detected by the airflow sensor 24 which generates an electrical signal that is passed to the control electronics 22. In response to the signal, the control electronics 22 activate the heating coil 28 and the electromagnet 70. The energized electromagnet 70 on the first plate 40 and the magnetic element 72 on the second plate 50 repel each other such that the plates 40, 50 (further) open the liquid reservoir opening 35 which causes liquid present in the liquid reservoir 34 to flow towards the heating coil 28 to be vaporized creating an aerosol (which may comprise gaseous and liquid components). As the user continues to suck on the e-cigarette 10, this aerosol is drawn through the upper and lower passages 37 toward the air inhalation port 36 and is inhaled by the user. At the same time the control electronics 22 also activate the LED 20 causing the LED 20 to light up which is visible via the translucent end cap 16 mimicking the appearance of a glowing member at the end of a conventional cigarette.

The spaced apart plates 40, 50 with their central liquid flow passage 60 form a capillary tube. As liquid present in the capillary tube formed by the spaced apart plates 40, 50 is converted into an aerosol more liquid is drawn into the capillary tube between the spaced apart plates 40, 50 from the liquid reservoir 34 by capillary action and thus is available to be converted into an aerosol through subsequent activation of the heating coil 28. The first and second plate 40, 50 are spaced apart such that liquid can be drawn from the liquid reservoir opening 35 towards the heating coil 28 by capillary force. Thus, the thin parallel plates 40, 50 act as a wicking system connected to a liquid reservoir 34.

State of the art atomizer structures use cotton or silica material in a woven string configuration as a wick or wicking system. This material is difficult to handle by machine and prone to variability. It also has no ability to change the liquid flow rate as a result of an increase or decrease in temperature or air suction. Consequently, when there is not enough liquid, thermal degradation known in the art may take place.

The proposed inventive wicking system consisting of at least two plates 40, 50 and a variable spacing of the plates 40, 50 allows a much better control of the liquid flow. The control electronics 22 can be adapted to fine tune the value of separation of the parallel plates 40, 50 to increase or decrease the amount of available liquid. The power supplied to the electromagnet 70 may be provided proportional to the heat generated by the atomizer 26. Increasing the current to the heating coil 28 and proportionally to the electromagnet 70 would increase the repulsive force acting on the plates 40, 50 and would widen the liquid flow passage 60. When the user stops puffing, the plates 40, 50 close. The liquid flow rate can be directly tuned to the power delivered to the heating wire which could compensate for an increased liquid consumption. The power supply to the electromagnet 70 can be adapted to be proportional to the air suction measured by the airflow sensor 24. This would allow the user to increase or decrease the liquid supplied from puff to puff.

The invention also offers full leakage protection when not being used since the thin parallel plates 40, 50 can be configured to be completely touching when no power is being delivered to the heating coil 28. This closes the liquid flow passage 60 and prevents liquid escaping when in off state.

Figure 3:
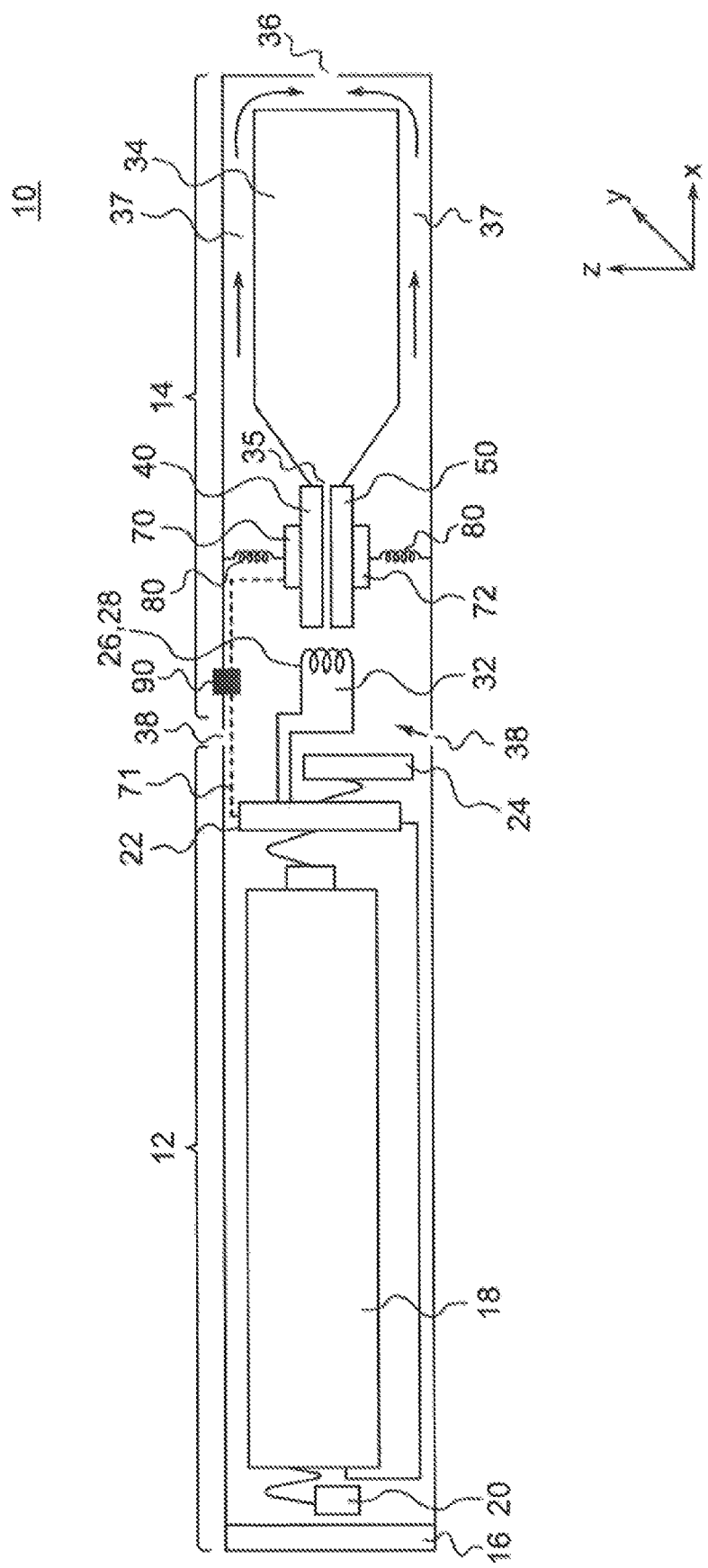
FIG. 3 is a schematic cross-sectional illustration of an exemplary e-cigarette of FIG. 1 with an additional push button.

FIG. 3 shows a slight modification of the embodiment of FIG. 1. Here, an additional push button 90 is provided on the electronic smoking device 10. The push button 90 is connected to the electromagnet 70. Pressing the push button 90 may increase or decrease the amount of liquid supplied to the atomizer 26 by increasing or decreasing the power supplied to the electromagnet 70. The push button 90 may be a simple switch between an on- and an off-state or may be pressure sensitive such that the level of pressure is proportional to the energy provided to the electromagnet 70. This would allow the user to directly control the amount of liquid supplied to the atomizer 26. The push button 90 could also be used to control the heating coil 28 as described before.

Some e-cigarettes are intended to be disposable and the electric power in the power supply 18 is intended to be sufficient to vaporize the liquid contained within the liquid reservoir 34 after which the e-cigarette 10 is thrown away. In other embodiments the power supply 18 is rechargeable and the liquid reservoir 34 is refillable. In the cases where the liquid reservoir 34 is a toroidal cavity, this may be achieved by refilling the liquid reservoir 34 via a refill port. In other embodiments the atomizer/liquid reservoir portion 14 of the e-cigarette 10 is detachable from the power supply portion 12 and a new atomizer/liquid reservoir portion 14 can be fitted with a new liquid reservoir 34, thereby replenishing the supply of liquid. In some cases, replacing the liquid reservoir 34 may involve replacement of the heating coil 28 along with the replacement of the liquid reservoir 34. A replaceable unit comprising the atomizer 26 and the liquid reservoir 34 is called a cartomizer.

The new liquid reservoir 34 may be in the form of a cartridge. Aerosol may flow around the exterior of the cartridge to an air inhalation port 36.

Of course, in addition to the above description of the structure and function of a typical e-cigarette 10, variations also exist. For example, the LED 20 may be omitted. The airflow sensor 24 may be placed adjacent the end cap 16 rather than in the middle of the e-cigarette. The airflow sensor 24 may be replaced with a switch which enables a user to activate the e-cigarette manually rather than in response to the detection of a change in air flow or air pressure.

Different types of atomizers may be used. The atomizer may use a piezoelectric atomizer to create an aerosol either in combination or in the absence of a heater.

The plates 40, 50 of FIGS. 1 to 3 are formed to extend linearly from the liquid reservoir opening 35 to the atomizer 26. However, they may also have a curved shape as will be shown in other embodiments.

Figure 4:
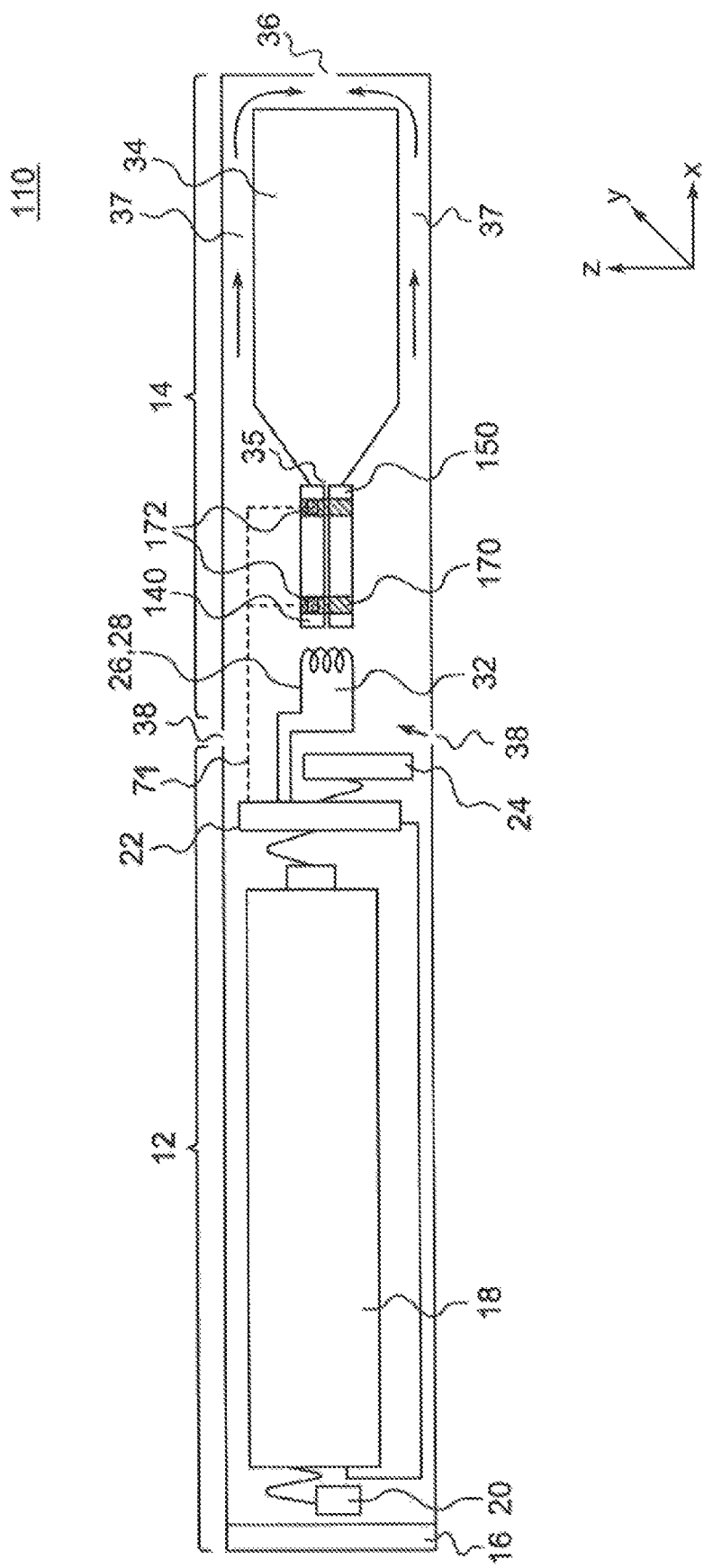
FIG. 4 is a schematic cross-sectional illustration of a second embodiment of the invention in a first mode of operation.
Figure 5:
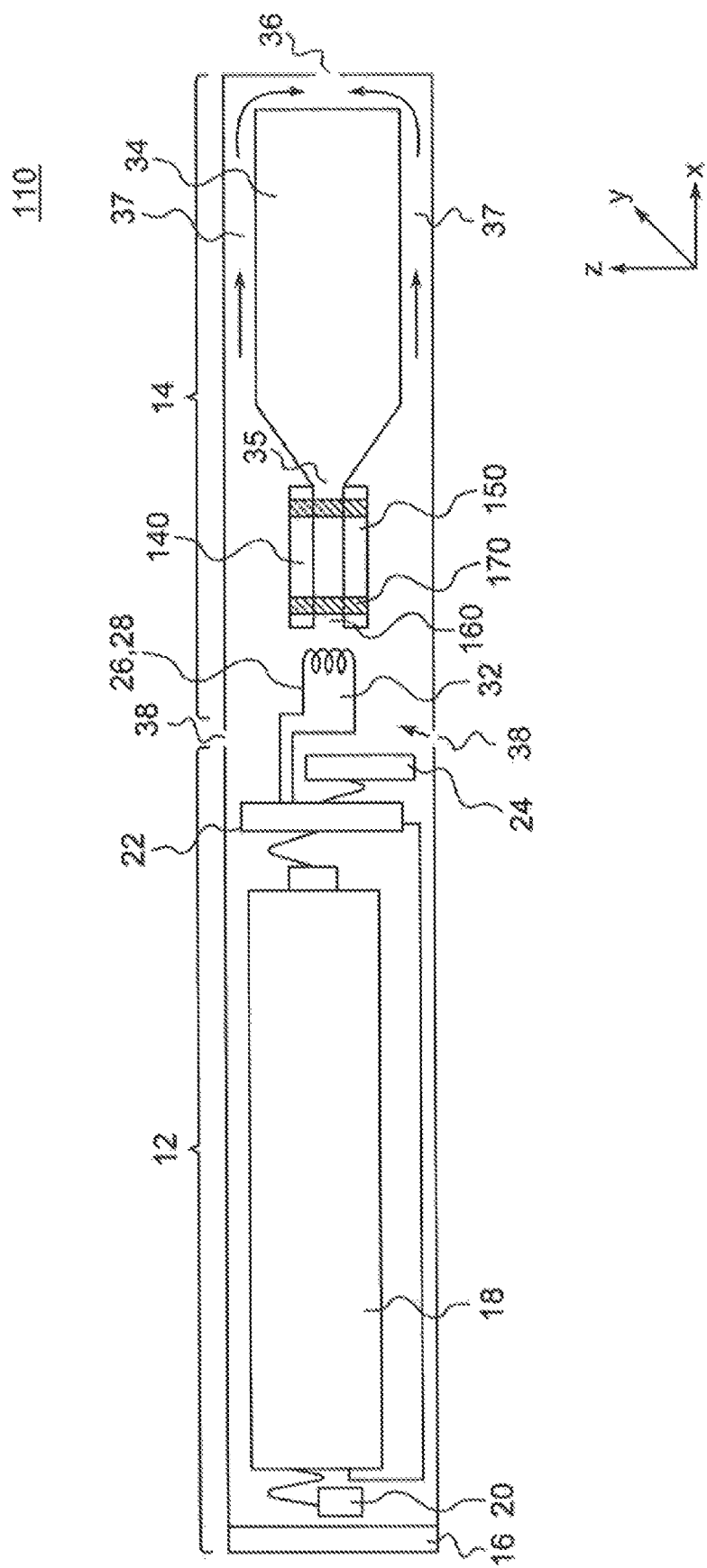
FIG. 5 is a schematic cross-sectional illustration of the second embodiment of the invention in a second mode of operation.

FIGS. 4 and 5 show a second embodiment of the inventive wicking system using a first plate 140 and a second plate 150 in a first state (FIG. 4) and in a second state (FIG. 5). In this second embodiment, the first and second plate 140, 150 are provided with two thermal expansion elements 170. The thermal expansion elements 170 connect the first and second plates 140, 150 to each other. The thermal expansion element 170 shown is a strip extending in a direction substantially perpendicular to the liquid flow passage 160 between the first and second plates 140, 150. In a first state as shown in FIG. 4, the electronic smoking device 110 is in its off state such that the thermal expansion elements 170 are not expanded. The thermal expansion element 170 is provided such that upon thermal expansion, the first and second plates 140, 150 are (further) spaced apart from each other. In an initial first state corresponding to the off-state of the electronic smoking device 110, the first and second plates 140, 150 either directly contact each other to close the liquid reservoir opening 35 or are only slightly spaced apart such that liquid from the liquid reservoir 34 is drawn between the first and second plates 140, 150 but does not reach the atomizer 26.

In use, a user sucks on the e-cigarette 110. This causes air to be drawn into the e-cigarette 110 via one or more air inlets, such as air inlets 38 and to be drawn through the central passage 32 along upper and lower passages 37 around the liquid reservoir 34 towards the air inhalation port 36. The air flow is indicated by arrows in FIG. 4. The change in air pressure which arises is detected by the airflow sensor 24 which generates an electrical signal that is passed to the control electronics 22. In response to the signal, the control electronics 22 activate the heating coil 28. The energized heating coil 28 generates heat which causes the thermal expansion element 170 to expand and to establish or increase a gap and thus the liquid flow passage 160 between the first plate 140 and the second plate 150. The liquid reservoir opening 35 is (further) opened which causes liquid present in the liquid reservoir 34 to flow towards the heating coil 28 to be vaporized creating an aerosol (which may comprise gaseous and liquid components). As the user continues to suck on the e-cigarette 110, this aerosol is drawn through the upper and lower passages 37 toward the air inhalation port 36 and is inhaled by the user. At the same time the control electronics 22 also activate the LED 20 causing the LED 20 to light up which is visible via the translucent end cap 16 mimicking the appearance of a glowing member at the end of a conventional cigarette.

The shown embodiment has the advantage that in comparison to the first embodiment, no additional power needs to be supplied to the plates to widen or close the liquid flow passage 160. The flow of liquid is controlled by the heat generated by the heating coil 28.

However, the thermal expansion elements 170 may optionally (as shown in FIG. 4) be provided with an additional heating element 172, e.g. a Peltier element connected to the control electronics 22 such that the heat at the thermal expansion element 172 could be further controlled by the control electronics 22. This allows controlling the spacing of the first and second plates 140, 150 and the dimension of the liquid flow passage 160 between the first and second plates 140, 150 directly via the control electronics 22 and not indirectly via the heating of the heating coil 28. Consequently, the liquid supplied to the heating coil 28 can be directly controlled. The thermal expansion element 170 shown in FIGS. 4 and 5 is a metal. Upon heating, the metal expands. The metal can be heated by the heat generated from the heating coil 28 and/or by the optional heating element 172.

Also the second embodiment may be combined with a push button as shown in FIG. 3. The push button would be connected to the thermal expansion elements 170. Pressing the push button may increase or decrease the amount of liquid supplied to the atomizer 26 by increasing or decreasing the power supplied to heating element 172 of the thermal expansion element 170. The push button may be a switch or may be pressure sensitive such that the level of pressure is proportional to the energy provided to the heating element 172. The push button could also be used to control the heating coil 28 as previously described.

Only one thermal expansion element 170 may be provided. The thermal expansion element 170 may be formed on outer surfaces of the first and second plates 140, 150 as shown in FIGS. 4 and 5. However, the two plates 140, 150 and the thermal expansion element 170 could be formed integrally such that the thermal expansion element 170 is part of the first and second plates 140, 150.

Figure 6:
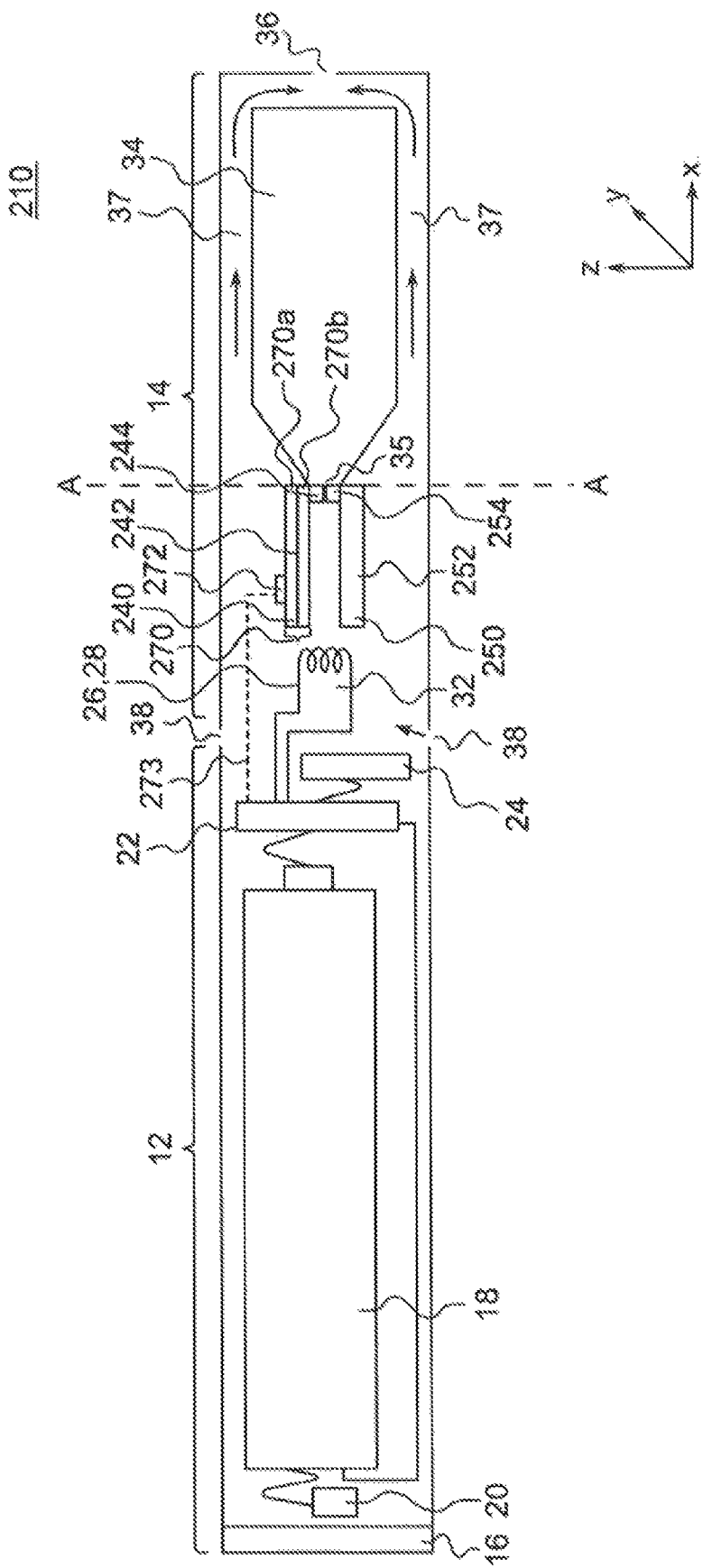
FIG. 6 is a schematic cross-sectional illustration of a third embodiment of the invention in a first mode of operation.
Figure 7:
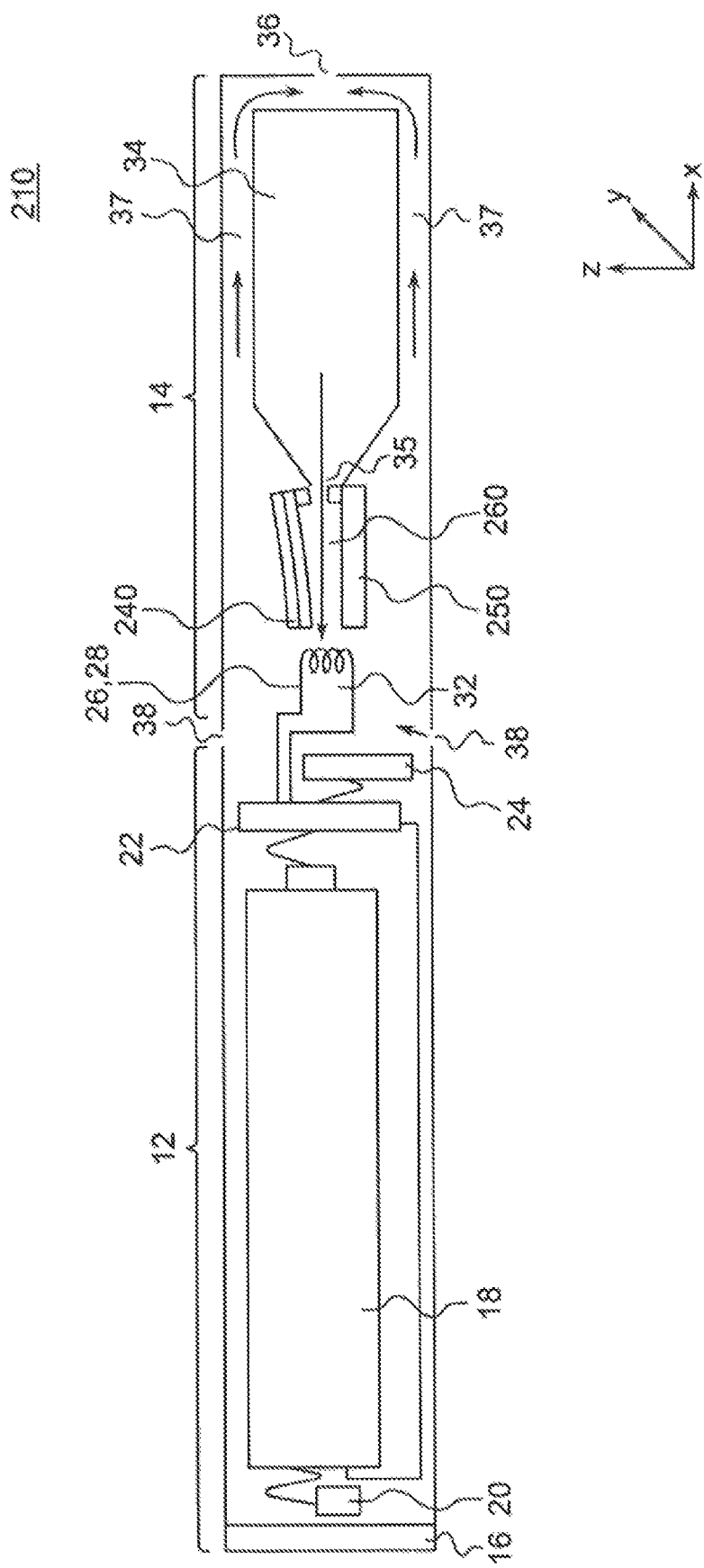
FIG. 7 is a schematic cross-sectional illustration of the third embodiment of the invention in a second mode of operation.

FIGS. 6 and 7 show a third embodiment of the inventive wicking system using a first plate 240 and a second plate 250 in a first state corresponding to an off-state of the electronic smoking device 210 (FIG. 6) and in a second state corresponding to an on-state of the electronic smoking device 210 (FIG. 7). In this third embodiment, at least one of the first and second plates 240, 250 comprises a bimetal structure 270 consisting of two different metals 270a, 270b having different thermal expansion components. The first and second plates 240, 250 have a body portion 242, 252 and a protrusion 244, 254 protruding from the body portion 242, 252 towards each other. In a first state as shown in FIG. 6, the electronic smoking device 210 is in its off state such that the bimetal structure 270 is not bent. The bimetal structure 270 is provided such that upon heating, the first and second plates 240, 250 become spaced apart from each other. In an initial first state corresponding to the off-state of the electronic smoking device 210, the protrusion elements 244, 254 of the first and second plates 240, 250 either directly contact each other to close the liquid reservoir opening 35 or are only slightly spaced apart such that liquid from the liquid reservoir 34 is drawn between the first and second plates 240, 250 but does not reach the atomizer 26.

In use, a user sucks on the e-cigarette 210. This causes air to be drawn into the e-cigarette 210 via one or more air inlets, such as air inlets 38 and to be drawn through the central passage 32 along upper and lower passages 37 around the liquid reservoir 34 towards the air inhalation port 36. The air flow is indicated by arrows in FIG. 6. The change in air pressure which arises is detected by the airflow sensor 24 which generates an electrical signal that is passed to the control electronics 22. In response to the signal, the control electronics 22 activate the heating coil 28. The energized heating coil 28 generates heat which causes the first and second metal 270a, 270b in the bimetal structure 270 to expand differently such that the first plate 240 is bent away from the second plate 250 on the side facing the liquid reservoir opening 35. A gap is established or increased between the protrusions of the first plate 240 and the second plate 250. The liquid reservoir opening 35 is (further) opened which causes liquid present in the liquid reservoir 34 to flow towards the heating coil 28 to be vaporized creating an aerosol (which may comprise gaseous and liquid components). As the user continues to suck on the e-cigarette 210, this aerosol is drawn through the upper and lower passages 37 toward the air inhalation port 36 and is inhaled by the user. At the same time the control electronics 22 also activate the LED 20 causing the LED 20 to light up which is visible via the translucent end cap 16 mimicking the appearance of a glowing member at the end of a conventional cigarette.

The shown embodiment has the advantage that in comparison to the first embodiment, no additional power needs to be supplied to the plates to widen or close the liquid flow passage 260. The flow of liquid is controlled by the heat generated by the heating coil 28.

However, the bimetal structure 270 may optionally (as shown in FIG. 6) be provided with an additional heating element 272, e.g. a Peltier element connected to the control electronics 22 such that the heat at the bimetal structure 270 could be further controlled by the control electronics 22. This allows controlling the bending of the first plate 240 and thus the spacing of the first and second plates 240, 250 and the dimension of the liquid flow passage 260 between the first and second plates 240, 250. Consequently, the liquid supplied to the heating coil 28 can be controlled.

In FIGS. 6 and 7, the first plate 240 is a bimetal structure 270. However, not the complete first plate 240 but only the end part of the first plate 240 facing the liquid reservoir opening 35 may have a bimetal structure 270 or may be provided with a bimetal structure 270. Further, also the second plate 250 may have a bimetal structure formed to bend away from the first plate 240. The first plate 240 may be flexible and a bimetal structure 270 may be formed attached to the flexible first plate 240 as a separate element. Further, also the second plate 250 may be provided with a bimetal structure 270 to bend away from the first plate 240.

Also, as in FIG. 3, a push button may be provided on the electronic smoking device 210. The push button would be connected to the additional heating element 272. Pressing the push button may increase or decrease the amount of liquid supplied to the atomizer 26 by increasing or decreasing the power supplied to additional heating element 272 of the bimetal structure 270. The push button may be a switch or may be pressure sensitive such that the level of pressure is proportional to the energy provided to the heating element 272. The push button could also be used to control the heating coil 28.

Figure 8B:
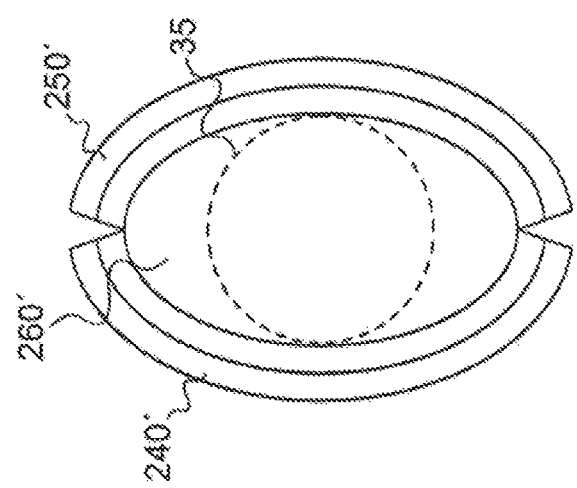
FIG. 8b is a schematic cross-sectional illustration of a fourth embodiment of the invention in a second mode of operation.
Figure 8A:
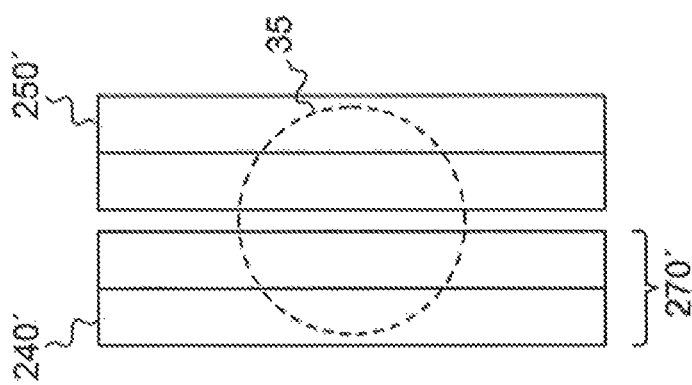
FIG. 8a is a schematic cross-sectional illustration of a fourth embodiment of the invention in a first mode of operation.

FIGS. 8*a* and 8*b* show in a fourth embodiment a different arrangement of bimetal plates 240', 250' in comparison to FIG. 7. Whereas in FIG. 7, the metal-metal axis of the bimetal structure 270 extends along the atomizer-liquid reservoir axis, the metal-metal axis of the bimetal structure 270' of FIG. 8*a* is perpendicular thereto. Shown in FIGS. 8*a* and 8*b* are the end faces of the plates 240', 250' facing the liquid reservoir opening 35 viewed along the atomizer-liquid reservoir opening axis corresponding to a vertical cut along line A-A in FIG. 6. In this embodiment, both plates 240', 250' are bimetal plates. The liquid reservoir opening 35 is indicated by the dashed circle. In the off-state of the electronic smoking device 210' as shown in FIG. 8*a*, the two plates 240', 250' are in contact with each other or are just slightly apart as explained before. The liquid reservoir opening 35 is closed or substantially closed and no liquid is supplied to the atomizer. In FIG. 8*b*, the heating coil of the atomizer is activated and produces heat. Due to the heat from the heating coil, the bimetal structure 270' is heated and the different metals of the bimetal structures 270' expand differently. The center regions of the two plates 240', 250' are bent away from each other to form a liquid flow passage 260' between the first and second plates 240', 250'. In FIG. 8*b*, the liquid reservoir opening 35 is not blocked at all and the liquid from the liquid reservoir is able to be drawn into the liquid flow passage 260' by capillary force. The cross-section of the liquid flow passage 260' formed has the O-shape.

Figure 9:
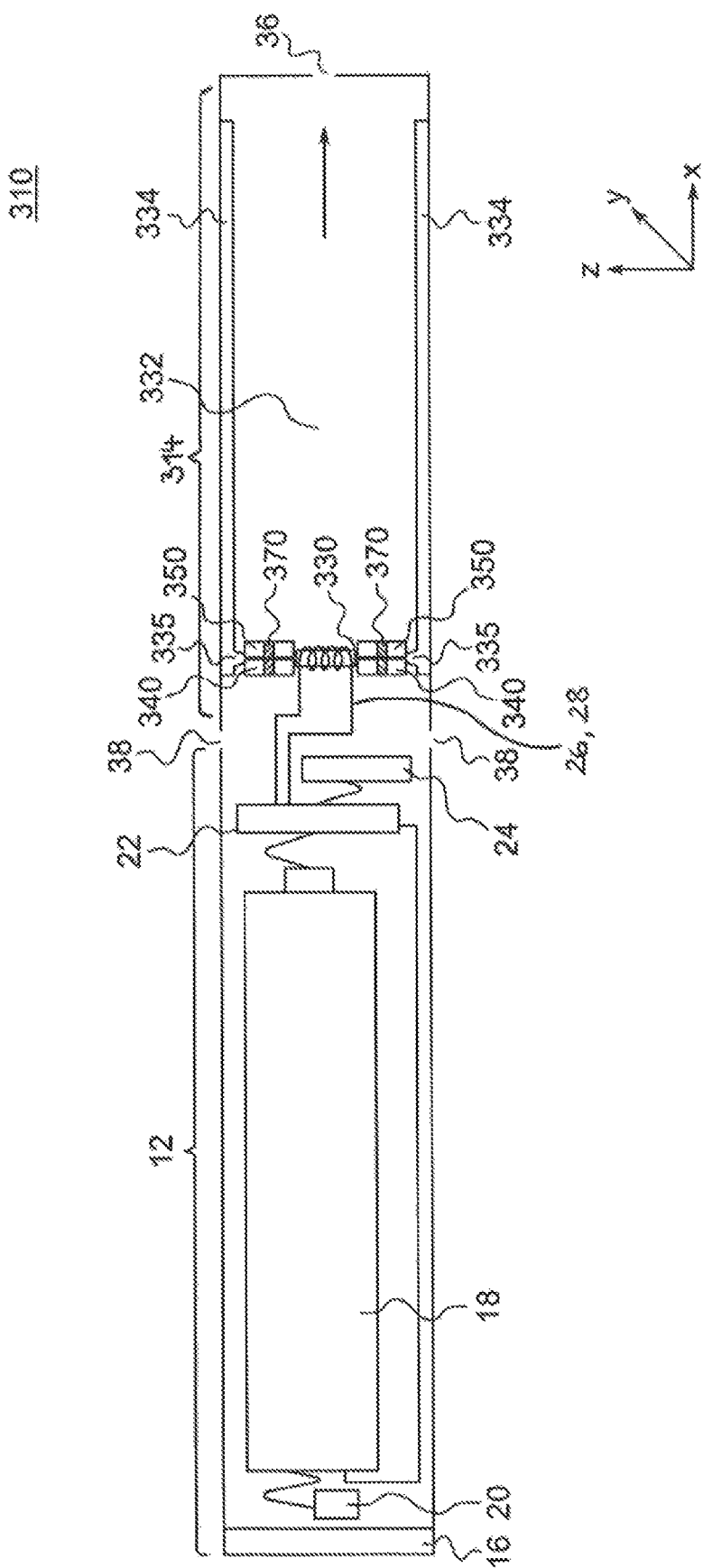
FIG. 9 is a schematic cross-sectional illustration of a fifth embodiment of the invention in a first mode of operation.

FIG. 9 shows a fifth embodiment of the invention. Here, the liquid reservoir 334 is cylindrically sleeved into the housing of the atomizer/liquid reservoir portion 314. The liquid reservoir 334 may exemplarily have two openings 335, each being in communication with two metal plates 340, 350 providing liquid to both side ends of the heating coil 28. The structure of each of the pair of plates 340, 350 corresponds to that of FIG. 4 such that its description shall not be repeated here. Each plate 340, 350 is provided with a thermal expansion element 370 as introduced in FIGS. 4 and 5.

In the example shown in FIG. 9, the atomizer 26 includes a heating coil 28 which is wrapped around a wick 330 extending across a central passage 332 of the atomizer/liquid reservoir portion 314. The wick 330, however, is optional. The wick 330 is provided inside the heating coil 28. The coil 28 may be positioned anywhere in the atomizer 26 and may be transverse or parallel to the liquid reservoir 334. The wick 330 and heating coil 28 do not completely block the central passage 332. Rather an air gap is provided on either side of the heating coil 28 enabling air to flow past the heating coil 28 and the wick 330. The central passage 332 is surrounded by a cylindrical liquid reservoir 334 with the ends of the wick 330 abutting or extending into the liquid reservoir 334. The wick 330 may be a porous material such as a bundle of fiberglass fibers, with liquid in the liquid reservoir 334 drawn by capillary action from the ends of the wick 330 towards the central portion of the wick 330 encircled by the heating coil 28.

In use, a user sucks on the e-cigarette 310. This causes air to be drawn into the e-cigarette 310 via one or more air inlets, such as air inlets 38 and to be drawn through the central passage 332 towards the air inhalation port 36. The change in air pressure which arises is detected by the airflow sensor 24 which generates an electrical signal that is passed to the control electronics 22. In response to the signal, the control electronics 22 activate the heating coil 28 which causes liquid present in the wick 330 to be vaporized creating an aerosol (which may comprise gaseous and liquid components) within the central passage 332. Due to the heat of the heating coil 28, the thermal elements 370 expand and additional liquid is supplied to the wick 330 via the liquid supply passage between the first and second plates 340, 350. As the user continues to suck on the e-cigarette 310, the aerosol is drawn through the central passage 332 and inhaled by the user.

At the same time the control electronics 22 also activate the LED 20 causing the LED 20 to light up which is visible via the translucent end cap 16 mimicking the appearance of a glowing member at the end of a conventional cigarette. As liquid present in the wick 330 is converted into an aerosol more liquid is drawn into the liquid flow passage between the first and second plates 340, 350 from the liquid reservoir 334 by capillary action and thus is available to be converted into an aerosol through subsequent activation of the heating coil 28.

Figure 10:
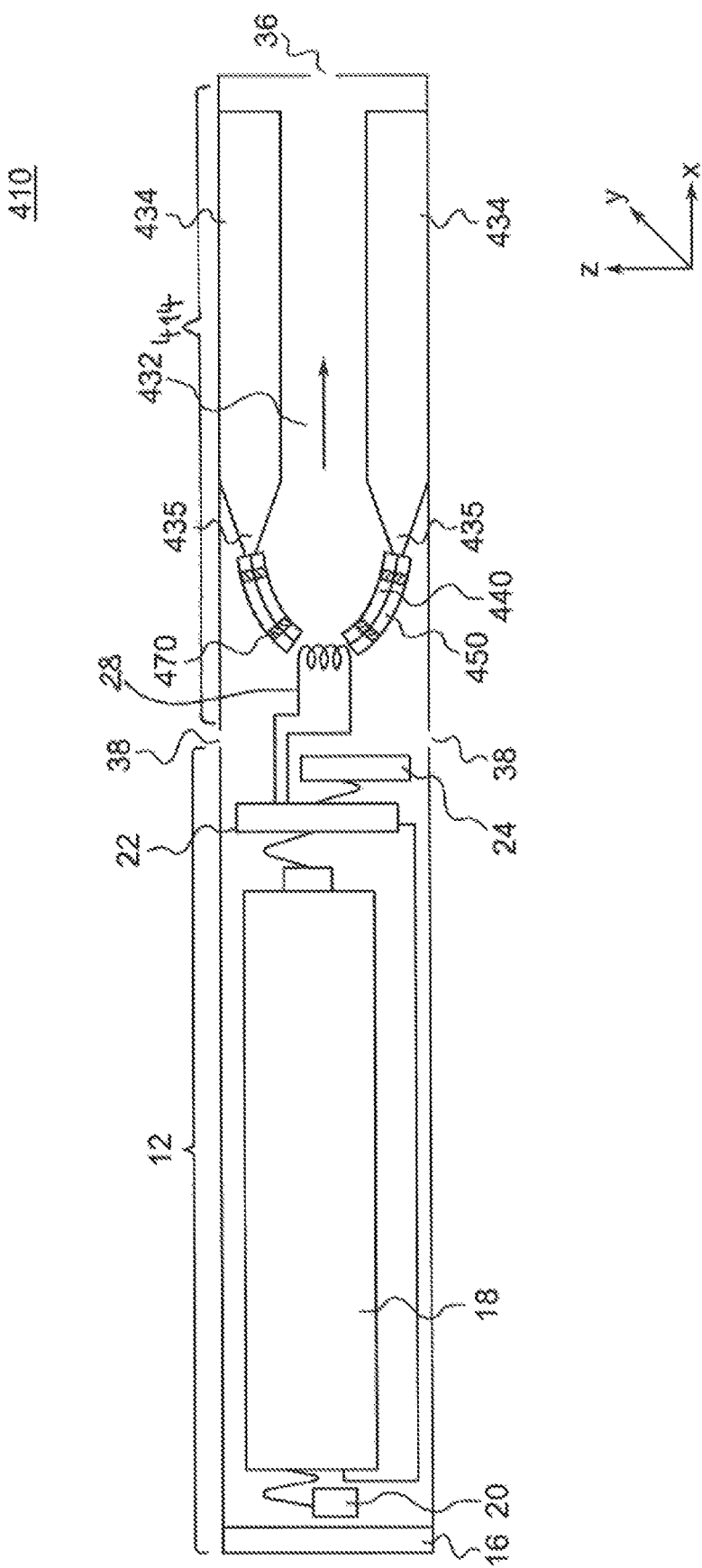
FIG. 10 is a schematic cross-sectional illustration of a sixth embodiment of the invention in a first mode of operation.

FIG. 10 shows a sixth embodiment of the invention. As in FIG. 8, the liquid reservoir 434 is cylindrically sleeved into the housing of the atomizer/liquid reservoir portion 414 around the central passage 432. The liquid reservoir 434 may have exemplarily two openings 435, each being in communication with two metal plates 440, 450 providing liquid to both side ends of the heating coil 28. The structure of each of the pair of plates 440, 450 is similar to that of FIG. 4 such that its description shall not be repeated here. Each plate 440, 450 is provided with a thermal expansion element 470 as introduced in FIGS. 4 and 5. However, in contrast to FIGS. 4 and 5, plates 440, 450 are not arranged linearly but curved from the liquid reservoir opening 435 towards the heating coil 28. Otherwise, the operation and function of the plates 440, 450 is the same as that of FIGS. 4 and 5 and shall not be repeated here.

Optionally, if two thermal expansion elements as shown in FIG. 10 and FIGS. 4 and 5 are provided, the first thermal expansion element closer to the heating coil 28 may have a smaller expansion coefficient in comparison to the second thermal expansion element distal to the heating coil 28. Otherwise, since the first expansion element would be provided with more heat than the second, distal expansion element, a uniform spacing between the plates may not be achieved.

Figure 11:
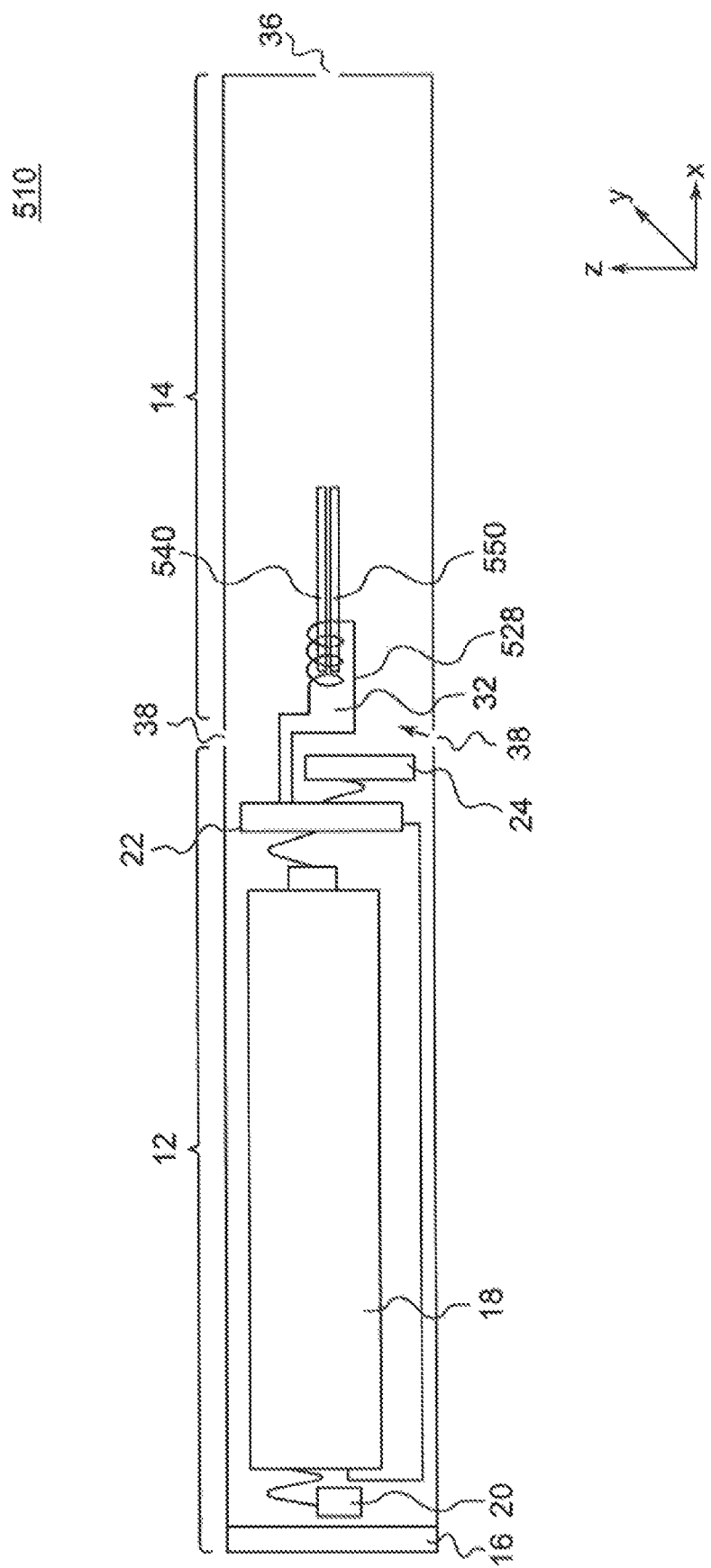
FIG. 11 is a schematic cross-sectional illustration of a seventh embodiment of the invention in a first mode of operation.

FIG. 11 shows a seventh embodiment of the invention. The structure is the same as that of FIG. 4. However, the heating coil 528 is not provided adjacent to end faces of the first and second plates 540, 550 but is wrapped around the end section of the first and second plates 540, 550 such that liquid can be supplied to the interior of the heating coil 528. This may further improve the vaporization of the liquid in the heating coil 528. Such arrangement can also be provided in any of the embodiments shown described herein.

Figure 12:
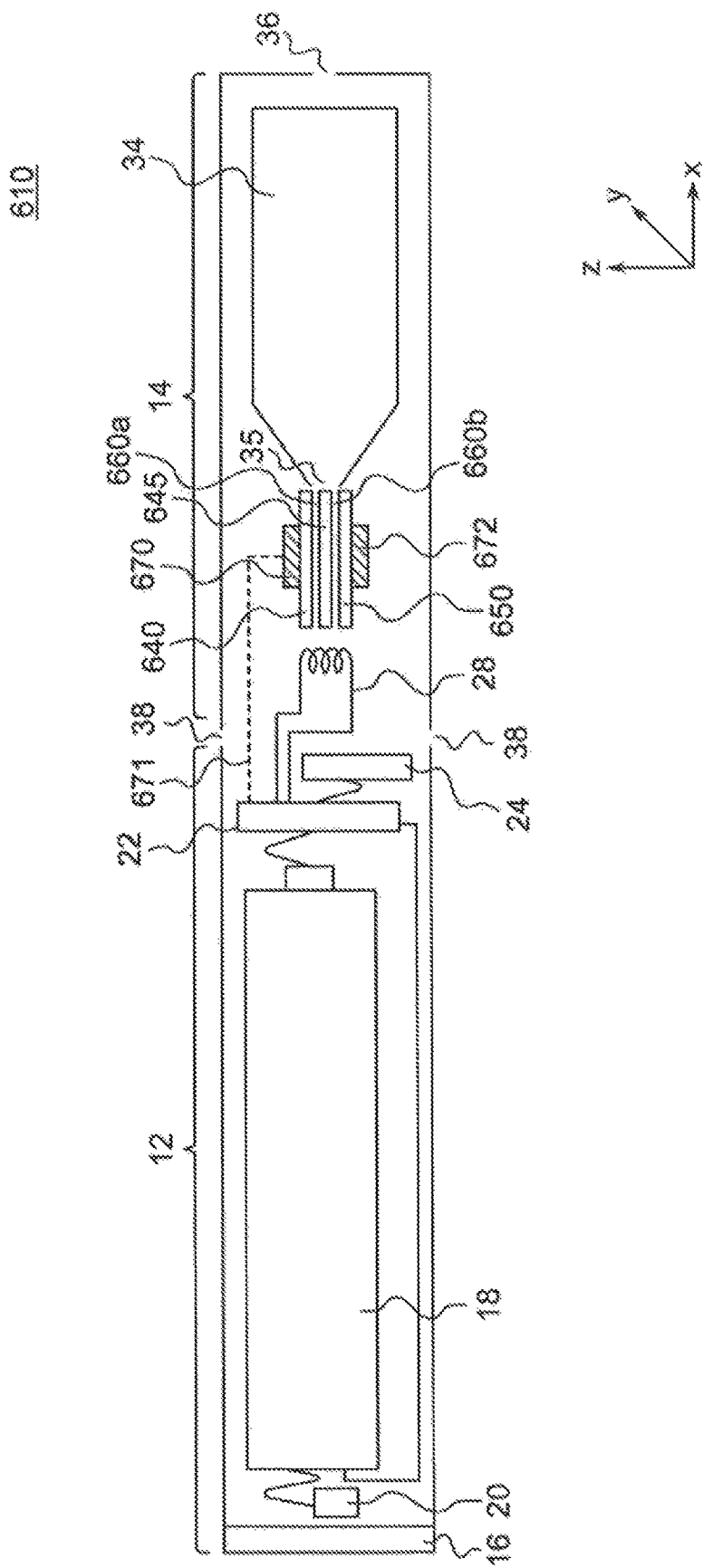
FIG. 12 is a schematic cross-sectional illustration of an eighth embodiment of the invention in a first mode of operation.

FIG. 12 shows an eighth embodiment of the invention. The electronic smoking device 610 corresponds to the electronic smoking device of FIG. 1. The only difference is the structure of the metal plates. Here, instead of two plates, three plates are provided. A first upper plate 640, a second lower plate 650 and a third center plate 645. The center plate 655 is provided at the center of the liquid reservoir opening 35. In the embodiment shown, two liquid flow passages 660a and 660b are formed, one between the first and the third plate 640, 645, one between the second and third plate 650, 645. In this embodiment, the center plate 645 is not fixed and the first and second plates 640, 650 are variable in their location to vary the size of the liquid flow passages 660a, 660b. The first plate 640 is provided with an electromagnet 670 as in FIG. 1. The second plate 650 is provided with a magnetic element 672. Their function is described during the description of FIG. 1 and shall not be repeated here. Also thermal expansion elements or bimetal structures could be used instead of the electromagnet and the magnetic element.

The use of more than two plates allows the formation of liquid flow passages with smaller diameter and thus larger capillary force. Also four plates could be used forming three liquid flow passages therebetween with all plates being variable in their location.

Further, in any of the shown embodiments, in order to allow for a nozzle structure of the liquid flow passage between first and second plates, the spacing between the plates may be non-uniform having a larger spacing at the end facing the liquid reservoir opening and a smaller spacing at the end facing the heating coil 28. Already in the off-state the spacing may be non-uniform. By choosing the materials and locations of the thermal expansion elements, the electromagnet and the magnet element or the bimetal structure accordingly, the non-uniform nozzle structure may be maintained or even increased in the on-state of the electronic smoking device.

In summary, in one aspect the electronic smoking device has a power supply, a liquid reservoir storing a liquid therein and having a liquid reservoir opening, and an atomizer adapted to atomize the liquid stored in the liquid reservoir when operated by the power supply. At least two plates are provided with an adjustable spacing therebetween, wherein a liquid flow passage is formed between the at least two plates extending from the liquid reservoir opening to the atomizer.

The spacing of the plates may be adjusted by a separation adjustment element. The separation adjustment element could be an electromagnet and a magnetic element, a thermal expansion element or bimetal structure.

The separation adjustment element can be connected to control electronics of the electronic smoking device such that the separation can be controlled by the control electronics. The separation adjustment element could also separate the plates in reaction to heat generated in the atomizer or in an additional heating element connected to control electronics.

At least two plates comprising a first plate and a second plate are provided between the liquid reservoir opening and the atomizer, the at least two plates being adapted to operate in a first mode, in which the at least two plates are provided to close the liquid reservoir opening and in a second mode, in which the at least two plates are provided spaced apart from each other such that the liquid reservoir opening is opened.

In the case that no or a minimum spacing between the at least two plates exists, the at least two plates are arranged to extend in parallel from the liquid reservoir to the atomizer. Additionally or alternatively, the plates are provided to block or substantially block the liquid reservoir opening when no spacing between the plates exists.

The at least two plates are provided biased towards each other by a resilient element.

The electronic smoking device may further comprise an electromagnet electrically connected to the power supply and coupled to a first plate of the at least two plates, and a magnetic element coupled to or being formed by a second plate of the at least two plates.

In an embodiment, at least one thermal expansion element is attached to the at least two plates and arranged to separate the at least two plates from each other upon thermal expansion. The thermal expansion element may extend perpendicular to the flow path between the at least two plates. The at least one thermal expansion element may comprise or may be a metal. The at least one thermal expansion element may be connected to the power supply of the electronic smoking device to control the separation of the at least two plates.

In an embodiment, one of the first and second plates is a (or is provided with a) bimetal provided to bend away from the other plate upon temperature increase. Also a second plate may be a bimetal provided to bend away from the bimetallic first plate upon temperature increase. The bimetal may be connected to the power supply of the electronic smoking device. Each of the plates may comprise a body portion and a protrusion protruding away from the body portion. The protrusions may be arranged to contact each other in the first mode to close or substantially close the liquid reservoir opening.

Two liquids reservoirs with two liquid reservoir openings may be provided, wherein at least two plates are provided to open or close each liquid reservoir opening.

Three or four plates may be provided between the liquid reservoir opening and the atomizer to form a plurality of liquid flow passages. By applying more than just one liquid flow passage, each passage can be formed with a smaller diameter establishing an increased capillary force.

Further provided is an atomizer/liquid reservoir portion for an electronic smoking device comprising a liquid reservoir storing a liquid therein and having a liquid reservoir opening, and an atomizer adapted to atomize the liquid stored in the liquid reservoir.

At least two plates are provided with an adjustable spacing therebetween, wherein a liquid flow passage is formed between the at least two plates extending from the liquid reservoir opening to the atomizer.

The spacing between the plates in an on- and off-state of the electronic smoking device may be non-uniform with a smaller liquid flow passage cross-section at the atomizer compared to the liquid flow passage cross-section at the liquid reservoir opening. The non-uniform shape may mimic a nozzle shape.

In all embodiments, the heating coil of the atomizer may be placed adjacent to the at least two plates or may also be wrapped around an end section of the at least two plates such that liquid is guided to the interior of the heating coil.

The different embodiments may also be combined such that for instance the push button of FIG. 3 can be used in all embodiments to control the separation of the plates. Also, a thermal expansion element could be used together with a bimetal structure. Or a thermal expansion element could be used together with an electromagnet.

While this invention has been described in connection with what is presently considered to be practical exemplary embodiments, it is to be understood that the invention is not limited to the disclosed embodiments, but, on the contrary, is intended to cover various modifications and equivalent arrangements included within the scope of the appended claims.

LIST OF REFERENCE SIGNS 10 electronic smoking device
12 power supply portion
14 atomizer/liquid reservoir portion
16 end cap
18 power supply
20 light emitting diode (LED)
22 control electronics
24 airflow sensor
26 atomizer
28 heating coil
32 central passage
34 liquid reservoir
35 liquid reservoir opening
36 air inhalation port
37 airflow passages
38 air inlets
40 first plate
50 second plate
60 liquid flow passage
70 electromagnet
71 electrical connection
72 magnetic element
80 resilient element
90 push button
110 electronic smoking device
140 first plate
150 second plate
160 liquid flow passage
170 thermal expansion element
172 additional heating element
210 electronic smoking device
240 first plate
240' bimetal plate
242 body portion of first plate
244 protrusion of first plate
250 second plate
250' bimetal plate
252 body portion of second plate
254 protrusion of second plate
260, 260' liquid flow passage
270 bimetal structure
270a first metal
270b second metal
272 additional heating element
310 electronic smoking device
314 atomizer/liquid reservoir portion
330 wick
332 central passage
334 liquid reservoirs
335 liquid reservoir opening
340 first plate
350 second plate
370 thermal expansion element
410 electronic smoking device
414 atomizer/liquid reservoir portion
432 central passage
434 liquid reservoirs
435 liquid reservoir opening
440 first plate
450 second plate
470 thermal expansion element
510 electronic smoking device
528 heating coil
540 first plate
550 second plate
610 electronic smoking device
640 first plate
650 second plate
655 third plate
660, 660a, 660b liquid flow passage
670 electromagnet
672 magnetic element

What is claimed is:

1. Electronic smoking device comprising:
a power supply;
a first liquid reservoir storing a liquid therein and having a first opening;
an atomizer adapted to atomize the liquid stored in the first liquid reservoir when operated by the power supply, wherein the atomizer includes a first side end opposing a second side end along a longitudinal axis of the atomizer; and
a first plate and a second plate having an adjustable spacing therebetween, wherein a liquid flow passage is formed between the first and the second plates, the liquid flow passage located between the first liquid reservoir opening and a first side end of the atomizer, and wherein the liquid flow passage is aligned with the longitudinal axis of the atomizer.

2. The electronic smoking device of claim 1, wherein the first and the second plates are arranged to block the first liquid reservoir opening when no spacing between the first and the second plates exists.

3. The electronic smoking device of claim 1, wherein the first and the second plates are biased towards each other by a resilient element.

4. The electronic smoking device of claim 1, further comprising an electromagnet electrically connected to the power supply and coupled to the first plate, and a magnetic element coupled to or being formed by the second plate.

5. The electronic smoking device of claim 1, further comprising at least one thermal expansion element attached to at least one of the first or the second plates, the thermal expansion element configured to separate at least a portion of the first and the second plates from each other upon thermal expansion.

6. The electronic smoking device of claim 5, further comprising a third plate and a fourth plate having an adjustable spacing therebetween, wherein a second liquid flow passage is formed between the third and the fourth plates, the second liquid flow passage located between the first liquid reservoir opening and a second side end of the atomizer.

7. The electronic smoking device of claim 5, wherein the at least one thermal expansion element is configured to be heated by the atomizer or by an additional heating element coupled to control electronics.

8. The electronic smoking device of claim 1, wherein the liquid reservoir is a cylindrical sleeve, and wherein the first plate, the second plate, and the atomizer are located within the cylindrical sleeve of the reservoir.

9. The electronic smoking device of claim 1, wherein the at least one of the first or the second plates includes, or is coupled to, a bimetal structure, and wherein the bimetal structure is configured to bend upon temperature variation such that a spacing is varied between the first and the second plates based on the temperature of the bimetal structure.

10. The electronic smoking device of claim 9, wherein the atomizer is transverse to the longitudinal axis of the liquid reservoir.

11. The electronic smoking device of claim 1, wherein each of the first and second plates comprise a first and second respective body portion and a first and second respective protrusion, wherein the respective first and second protrusions are configured for communication with the first liquid reservoir opening.

12. The electronic smoking device of claim 1, further comprising a second liquid reservoir having a second liquid reservoir opening, wherein the first liquid reservoir opening includes the first plate and the second plate, and the second liquid reservoir opening includes a third plate and a fourth plate, the first and the second plates configured to open or close the first liquid reservoir opening, and the third and the fourth plates configured to open or close the second liquid reservoir opening.

13. The electronic smoking device of claim 1, wherein a push button is provided on the electronic smoking device and the spacing between the first and second plates is adjustable using the push button.

14. An electronic smoking device including an atomizer and first liquid reservoir portion comprising:
    a first liquid reservoir adapted to store a liquid therein and having a first liquid reservoir opening;
    the atomizer adapted to atomize the liquid stored in the first liquid reservoir, wherein the atomizer includes a first side end opposing a second side end along a longitudinal axis of the atomizer; and
    a first plate and a second plate having an adjustable spacing therebetween, wherein a liquid flow passage is formed between the first and the second plates, the first and the second plates located between the first liquid reservoir opening and the first side end of the atomizer, and wherein the liquid flow passage is aligned with the longitudinal axis of the atomizer.

15. The electronic smoking device of claim 14, wherein the first and second plates are arranged at a first spacing to retain liquid in the first liquid reservoir.

16. The electronic smoking device of claim 14, further comprising a third plate and a fourth plate having an adjustable spacing therebetween, wherein a second liquid flow passage is formed between the third and the fourth plates, the second liquid flow passage located between the first liquid reservoir opening and a second side end of the atomizer.

17. The electronic smoking device of claim 14, further comprising an electromagnet electrically connected to the power supply and coupled to the first plate, and a magnetic element coupled to or being formed by the second plate.

18. The electronic smoking device of claim 14, further comprising at least one thermal expansion element attached to at least one of the first or the second plate, the thermal expansion element configured to separate at least a portion of the first plate from the second plate upon thermal expansion.

19. The electronic smoking device of claim 14, wherein the liquid reservoir is a cylindrical sleeve, and wherein the first plate, the second plate, and the atomizer are located within the cylindrical sleeve of the reservoir.

20. The electronic smoking device of claim 14, wherein the atomizer is transverse to the longitudinal axis of the liquid reservoir.

* * * * *